United States Patent [19]

Wright et al.

[11] Patent Number: 4,969,732

[45] Date of Patent: Nov. 13, 1990

[54] DISPLAY DEVICE

[75] Inventors: Graham L. Wright, Middlesex; Mark Dempster, Bristol, both of England

[73] Assignee: Thorn EMI plc, London, England

[21] Appl. No.: 314,020

[22] Filed: Feb. 23, 1989

[30] Foreign Application Priority Data

Feb. 25, 1988 [GB] United Kingdom ............... 8804402

[51] Int. Cl.⁵ .............................................. G03B 21/28
[52] U.S. Cl. ...................................... 353/77; 353/98; 353/122
[58] Field of Search ...................... 353/77, 78, 98, 99, 353/38, 122; 350/169, 171, 172

[56] References Cited

U.S. PATENT DOCUMENTS

| | | | |
|---|---|---|---|
| 3,711,188 | 1/1973 | Zehnpfennig | 353/77 X |
| 3,807,849 | 4/1974 | Lobb | 353/88 X |
| 3,941,467 | 3/1976 | Kapany et al. | 353/34 |
| 4,026,634 | 5/1977 | Fukushima | 350/128 |
| 4,173,399 | 11/1979 | Yevick | 353/78 |
| 4,556,913 | 12/1985 | Van Breemen et al. | |
| 4,586,786 | 5/1986 | Suzuki et al. | 350/169 |

FOREIGN PATENT DOCUMENTS

| | | |
|---|---|---|
| 746256 | 11/1966 | Canada ............... 350/117 |
| 0233662 | 8/1987 | European Pat. Off. . |
| 92867 | 7/1897 | Fed. Rep. of Germany . |
| 2042206 | 9/1980 | United Kingdom . |
| 1590679 | 6/1981 | United Kingdom . |
| 2120396 | 11/1983 | United Kingdom . |

OTHER PUBLICATIONS

JP 5479030A by Hitachi Published Jun. 23, 1979 English Language Abstract Published Aug. 29, 1979.

Primary Examiner—Harry N. Haroian
Attorney, Agent, or Firm—Fleit, Jacobson, Cohn, Price, Holman & Stern

[57] ABSTRACT

A display device includes equipment for projecting light onto a surface. The equipment includes a beam-splitter for effecting partial reflection and partial transmittance of an incident beam. On one side of the beam-splitter are a light source for directing light onto the beam-splitter and a mirror for directing back towards the beam-splitter light reflected therefrom. On the other side of the beam-splitter is a louvre for permitting passage therethrough of light of incident angle relative to a normal to the beam-splitter with in a predetermined restricted range.

7 Claims, 5 Drawing Sheets

DISPLAY DEVICE

The present invention relates to equipment for projecting light onto a surface. The surface may be a screen onto which an image is projected or a display panel which is backlit. In particular, the present invention relates to equipment for use in a rear-projection television display.

The thickness of conventional rear-projection television displays is restricted by the angle or position at which the final mirror needs to be placed in order to "throw" the image onto the screen. Even for short focal length projection lenses the total width of the system cannot be reduced beyond approximately 40 cm for a 1 metre diagonal display.

GB No. 1590679 (Izon) discloses an optical projector including a plurality of reflecting surfaces for intercepting and folding a cone of light and a dual function optical element adapted to reflect or to transmit light according to the angle of incidence of incident light thereon relative to the critical angle of reflection, the said dual function optical element being defined by a transparent prism sheet including a multiplicity of prisms at one surface and the other surface thereof being flat. However, as disclosed in that document, if the thickness of the prism sheet is too great, the projected image becomes badly distorted due to crossing of the light rays from the image to be projected. In order to improve the image, the disclosure teaches using a large number of prisms (so that the distortion produced will not be resolved by the human eye) or using a second pair of prism sheets (thereby 'uncrossing' the crossed light rays).

It is an object of the present invention to provide equipment for the projection of light onto a surface which at least alleviates the problems described hereinbefore.

According to the present invention there is provided equipment for projecting light onto a surface, the equipment comprising:

beam-splitting means for effecting partial reflection and partial transmittance of an incident beam;

a light source located on one side of the beam-splitting means for directing light onto the beam-splitting means;

mirror means on said one side of the beam-splitting means; for directing back towards the beam-splitting means light reflected from the beam-splitting means;

and louvre means located on the other side of the beam-splitting means for permitting passage therethrough of light in a predetermined restricted range of incident angles relative to a normal to the beam-splitting means.

In equipment provided in accordance with the present invention, the effect of the beam-splitting means and the mirror means is to reduce the amount of space required between the light source and a surface to be illuminated for a required magnification. The louvre means absorbs light of incident angle relative to a normal to the beam-splitting means outside the predetermined restricted range and so reduces the effect of unwanted rays of light produced by the beam-splitting means.

Equipment provided in accordance with the present invention is particularly suited for use in rear-projection television displays as the louvre means reduces the effect of secondary images which would otherwise be produced by the unwanted rays of light from the beam-splitting means. Accordingly, in an advantageous embodiment of the present invention, the light source includes a display panel for producing an image to be projected.

In one preferred embodiment, the louvre means is constructed so that the predetermined restricted range of incident angles relative to a normal to the beam-splitting means varies with position along the louvre means, light of incident angle within this range being transmitted by the louvre means. This provides edge-compensation ensuring uniform illumination over the surface. Preferably the louvre means comprises a substrate having a plurality of passageways arranged in side-by-side relation for allowing transmission of light of an incident angle relative to an axis of a passageway within a predetermined range wherein two or more adjacent passageways have a transmission direction at an angle of deviation from a parallel relationship. Such variation in louvre angle may be achieved by manufacturing a substrate of rigid form with passageways fixedly arranged with the appropriate variation in angle; alternatively there may be manufactured a flexible substrate which in its standard state has parallel passageways, but which can be bowed (and then secured by a support frame in that position) such as to provide one or more regions wherein adjacent passageways are not quite parallel.

In another preferred form, a Fresnel lens arrangement is provided intermediate the beam-splitting means and the louvre means. In this way, collimating of the light having passed through the beam-splitting means is achieved.

The beam-splitting means may comprise a substrate having alternating reflective and transparent strips arranged such that light reflected back from mirror means is incident on transparent strips of the beam-splitting means.

Preferably, provision is made in the equipment to ensure that the light is linearly polarised prior to its first incidence on the beam-splitting means. In this way the intensity, and hence the deleterious effects, of ghosting images which may be produced at the beam-splitting means can be significantly reduced to an imperceptible level.

In order that the invention may more readily be understood, a description is now given, by way of example only, reference being made to the accompanying drawings in which.

Figure 1:
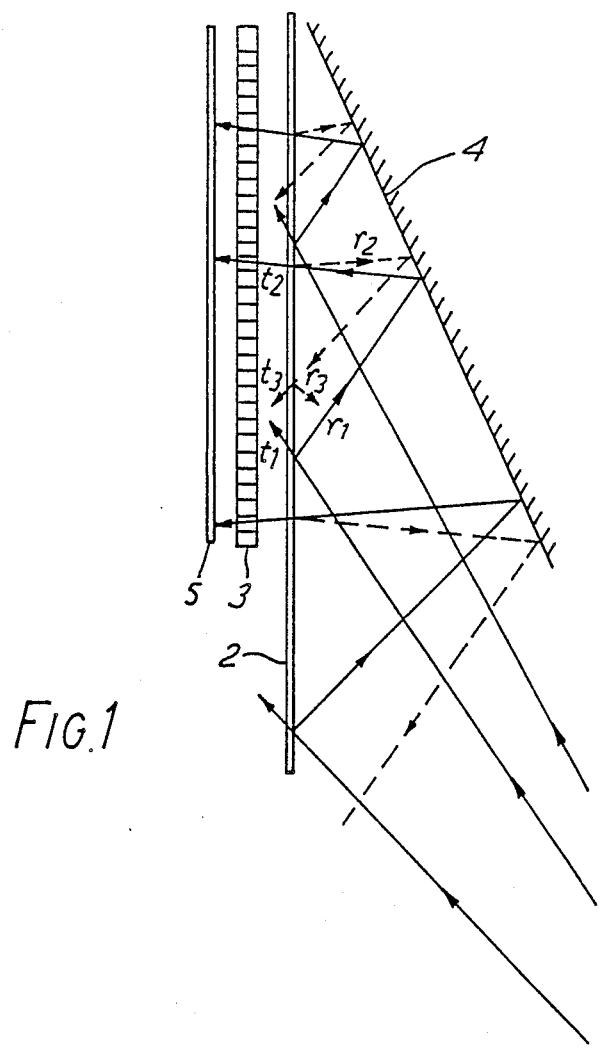
FIG. 1 shows schematically part of a display device embodying the present invention.
Figure 9:
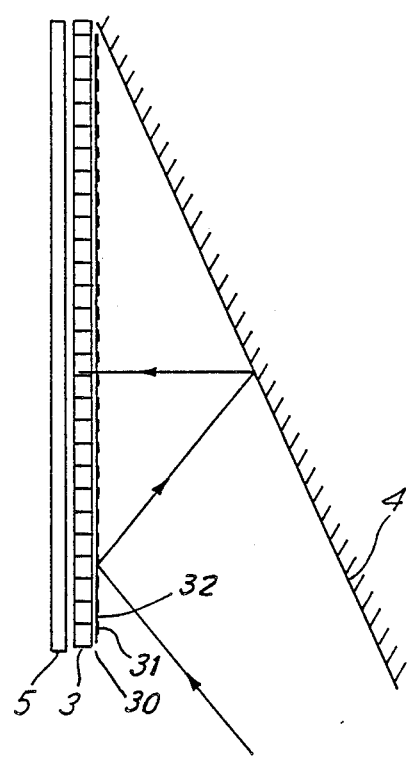

and FIG. 9 shows schematically another modification to the display device of FIG. 1.

FIG. 1 shows part of a display unit consisting of a diffuser plate 5 which is illuminated from the rear. A light source (not shown) directs a beam of light onto a beam-splitter 2, the transmitted section $t_1$ of this beam passing on to a louvred plate 3 where this section is absorbed as its direction is at a substantial angle to the transmission direction of the lourvre, i.e. that direction at which the louvre permits passage. The section $r_1$ of this beam which is first reflected at the beam-splitter 2 passes to a mirror 4, disposed at an angle of $\phi$ to the beam-splitter 2, the mirror directing section $r_1$ back towards the beam-splitter 2. This time, the portion $t_2$ which is transmitted is subsequently incident on the louvred plate 3 at an angle within a predetermined restricted range such that it passes therethrough and onto the diffuser plate 5; the portion $r_2$ which is reflected is subsequently directed back by mirror 4 towards the beam-splitter 2. Any portions subsequently transmitted through the beam-splitter are either at an angle to inhibit passage through the louvred plate 3 or of very low intensity, thereby having no significant effect on the illumination of diffuser plate 5.

The louvred plate 3 may be a louvre sheet having 3.5 louvres per centimetre, each louvre being of width 0.5 cm.

The overall thickness of the display unit can be further reduced by allowing the incident beam to reflect off an additional mirror before beam-splitter 2.

Figure 2:
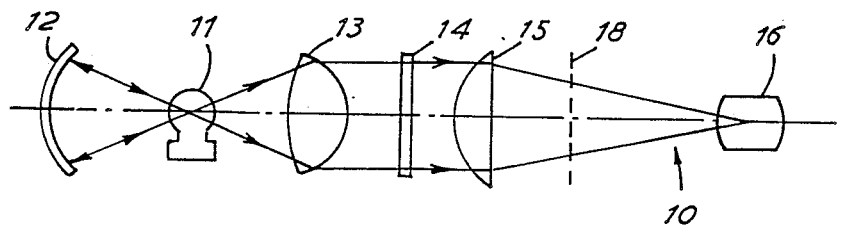
FIG. 2 shows a light source for use with one embodiment of the present invention.

As indicated hereinbefore, this system is particularly suited for use in rear-projection television displays. A light source 10 for use with the system of FIG. 1 in a rear projection television display is shown in FIG. 2. The light source 10 comrises a lamp 11, a concave mirror 12, an aspheric condenser 13, IR/UV filters 14, a plano-convex lens 15 and a projection lens 16. A display panel 18 for producing the image to be projected is positioned between the plano-convex line 15 and the projection lens 16. In this embodiment, the diffuser plate 5 is effective as the screen of the television display.

Figure 3:
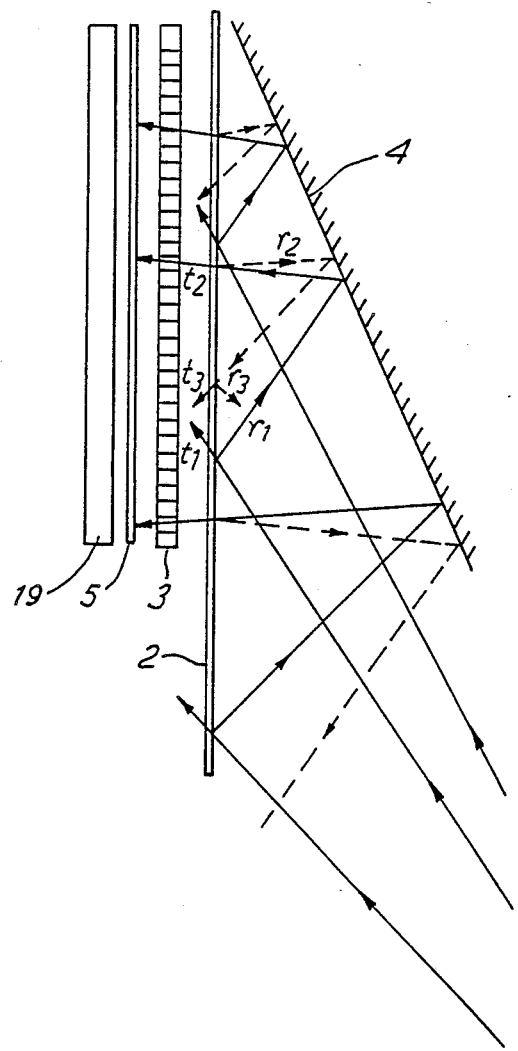
FIG. 3 shows schematically part of a second embodiment of the present invention.

Alternatively, the system may be used to backlight a large display panel 19 as shown in FIG. 3, or with the diffuser plate 5 positioned after the display panel 19 to produce a shadow image of the display.

Figure 4:
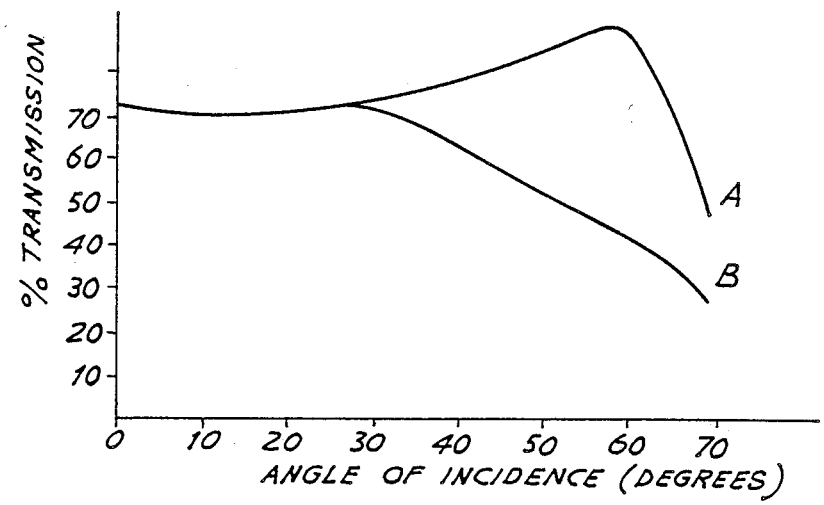
FIG. 4 is a graph showing variation in reflection and transmission coefficients with incident angle of a beam-splitter for use in the present invention.
Figure 5:
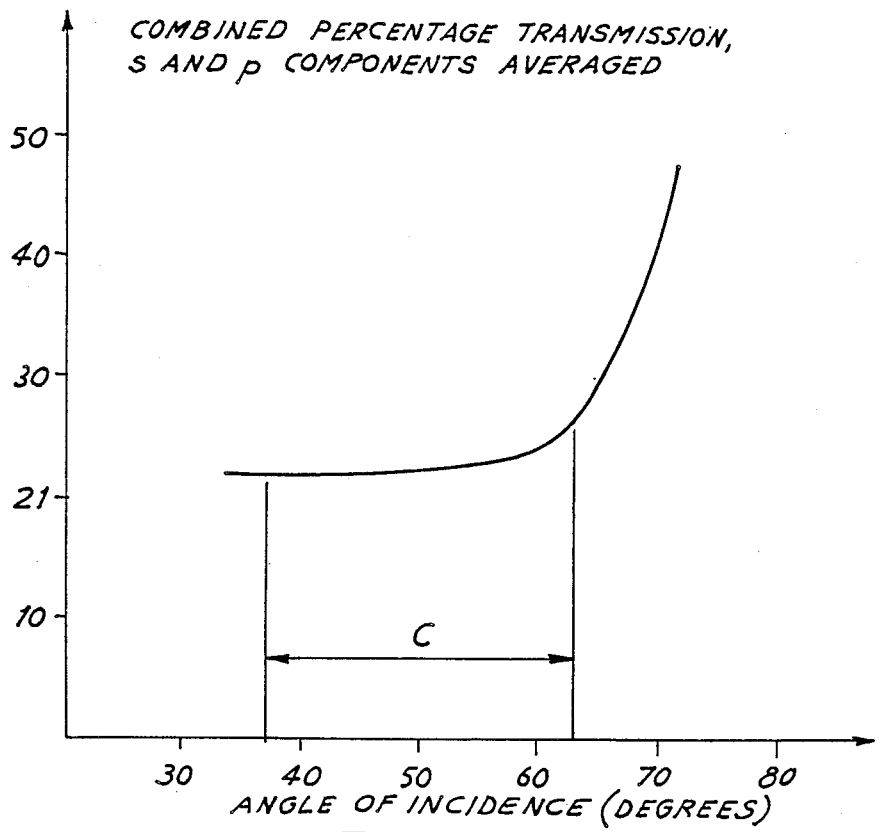
FIG. 5 is a graph showing total transmission of light against initial incident angle for a beam-splitter for use in the present invention.

The beam splitter 2 shown is of the single layer delectric type which is relatively cheap and of maximum efficiency (i.e. minimum internal absorption). One example is a glass plate coated on one side with titanium oxide and on the other side with an anti-reflection coating of magnesium fluoride. The specific characteristics of the beam splitter depend on the thickness of the coating of dielectric. However, as shown in FIG. 4, the reflection and transmission coefficients of such a beam splitter are dependent on both the angle of incidence and the polarization state of the incoming rays; graph A shows the variation for the p polarization component (parallel to the plane of incidence) and graph B the variation for the s polarization component (perpendicular to the plane of incidence). The effect of this variation for a particular incoming ray is determined by multiplying the reflectivity at the first interaction with the beam splitter by the transmissivity at the second interaction with the beam splitter for each of the polarization components and then taking a weighted average to represent the polarization state of the incoming light. An example of this is shown in FIG. 5 from which it can be seen that reasonably uniform illumination can be obtained if the polarization state of the incoming light and the system geometry are carefully chosen. The arrow C indicates the limit of initial angle of incidence in a practical system. Any variation in illumination over the area could, in principle, be used to partially counterbalance effects resulting from the non-uniform transmission with angle of incidence of a display panel such as a liquid crystal display.

Other considerations which need to be taken into account when designing a system are the positioning of the image to be projected on the diffuser plate screen 5 and also the efficient use of the spacer between the beam splitter 2 and the mirror 4. For correct positioning of the projected image, the light ray from the centre of the display panel should eventually be incident on the centre of the screen 5. For efficient use of space, the outer rays of the cone of light from the light source should be collinear with the surface of the mirror 4. In a practical embodiment, the angle $\phi$ between the beam splitter and the mirror is 25.68°; the angle between the axis of the projected cone of light and the horizontal (for a vertical screen) is 51.35°; and the cone angle on the picture vertical of the projected cone of light is 25.94°.

The system tends to suffer from considerable light loss, as the image forming beam must pass through a beam splitter twice, resulting in a light loss of about 75% even before account is taken of the other losses in the system (e.g. reflection losses from the mirrors).

Since the system results in the image forming rays $t_2$ passing through the louvres at a range of angles equal to that covered by the initial projected light cone, and since the louvred plate 3 has sharply reduced transmission at angles away from the normal, it is necessary to choose the cut-off angle of the louvres to be significantly larger than the cone angle of the original projected beam to avoid marked fall-off of intensity at the top and bottom of the image. Whilst such a fall-off in image intensity could be compensated for by use of a graduated neutral density filter, this would introduce further light losses and is therefore unacceptable in practice.

Conversely the louvred plate 3 must have a sufficiently small cut-off angle to trap the transmitted rays $t_1$ and $t_3$ which would otherwise produce unwanted 'ghost' images. Accordingly, a small projected cone angle is appropriate, for example 26° in the vertical axis, and whilst the device is still substantially thinner than competing systems, its full potential is not achieved.

Figure 6:
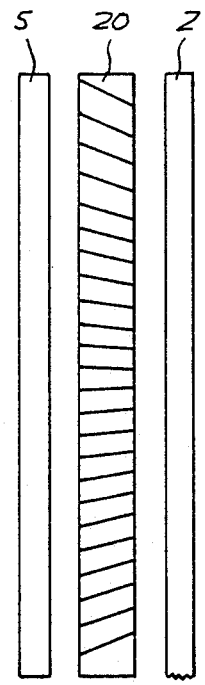
FIGS. 6 and 7 shows schematically modifications to the display device of FIG. 1.

One solution to the problem of louvre cut-off is to provide a louvre 20 of variable angle as shown schematically in FIG. 6 so that the transmission direction of adjacent passageways near the edges of the louvre is at an angle of deviation from a parallel relationship. In this way, the angle of incidence relative to a normal to the beam-splitter of light that can pass through the louvre varies with position along the louvre.

The louvre 20 is assembled so that towards the edges adjacent louvres are not exactly parallel. Such a louvre can be produced, as disclosed in copending U.S. patent application claiming priority form British Patent Application No. 8903964.8, by providing a thin, matt black tape extending a number of times across a screen frame between pins set into the screen frame. The angle of each pin to the screen frame defines the angle of a passageway formed by the tape in the louvre and hence the transmission direction of that passageway. Alternatively the louvre sheet suggested as the louvred plate 3 could be bowed and then held in that position to achieve the same effect, but this results in increased package depth. In either version, the image forming rays then pass parallel to the local direction of the louvres, and minimal attenuation of these rays results.

Figure 7:
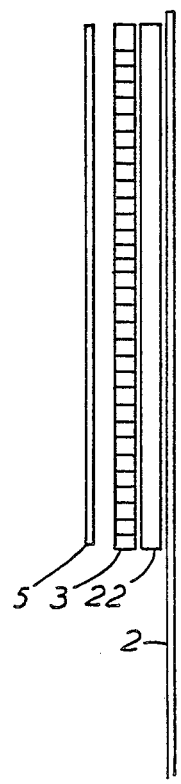

In another solution to the louvre cut-off problem, as shown in FIG. 7, a Fresnel lens 22 is provided prior to the louvred plate 3 to collimate the image forming rays.

Detailed geometric analysis of the problem demonstrates that the effect of either of these modifications is such that the minimum angle which the transmitted rays $t_1$, $t_3$ form with the louvre direction is greater than occurs in the basic arrangement of FIG. 1. This can be seen by reference to FIG. 8, which shows the angle $a$, which the component $t_3$ forms to the louvre direction, as a function of the screen position at which the ray $t_3$ strikes for the standard configuration (minimum angle 26.6°) as indicated by curve $A^1$, the variable-angle louvres (minimum angle 33.4°) as indicated by curve $B^1$, and the Fresnel system (minimum angle 40.5°) as indicated by curve $C^1$. Rays which strike close to the bottom of the screen are reflected at angles such that $t_3$ strikes below the position of the final image and are therefore ignored.

Figure 8:
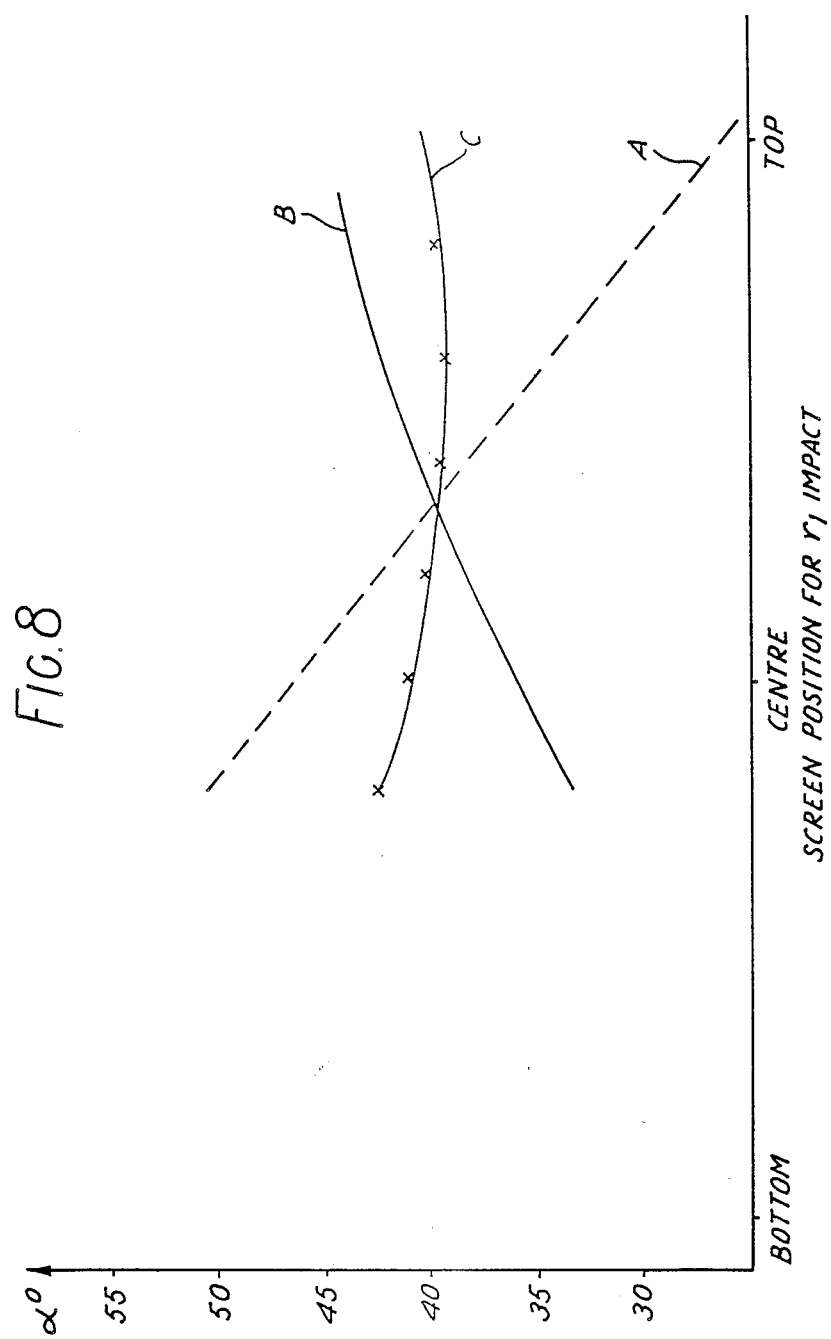
FIG. 8 is a graph indicating relative performance of different implementations of the present invention.

The analysis for FIG. 8 is for the case where a 40° cone angle (in the vertical direction) is obtained from the light source and mirror angles and positions are chosen such as to make the ray $t_2$ normal to the screen at the centre of the image, and to minimise the overall thickness of the system. The angle which $t_3$ forms to the screen is compared for the three possible implementations.

In the case of the ray $t_1$, in the basic implementation of FIG. 1 the minimum angle which this forms to the louvres can be shown to be equal to that for $t_3$, but in the case of $t_1$ this occurs below the image position anyway. In the case of both the variable louvre angle and Fresnel lens implementations $t_1$ forms a much larger angle to the louvre than in the basic implementation.

The louvre film does attenuate the transmitted light, even when it is at normal incidence (i.e. parallel to the louvre directions), and this effect becomes more pronounced as the density of louvres is increased to reduce the cut-off angle.

The effect of these modifications is therefore such as to permit the use of a higher cut-off angle for the louvre film, with a resulting small increase in peak picture brightness (typically 10% to 20%), as well as allowing peak picture brightness to be maintained across the entire image.

Another problem is that the air/glass surface of the beam splitter also reflects a significant amount of light because of the high incidence angles of the incoming rays $r_1$ (even when the air/glass surface is anti-reflection coated); this can result in a low intensity ghost image close to the main image. One solution to this image-ghosting problem is to linearly polarise the incoming light such that its electric field is parallel to the plane of incidence. This can sharply reduce the intensity of the ghost image to the level where it is no longer visually noticeable. While in the application of this invention to slide projectors this does result in a loss of light intensity, when a liquid crystal display is projected the light is already polarised, and it is only necessary to design the system such that this polarisation is in the correct direction. In certain circumstances this arrangement results in reduction of the primary beam image if a polarisation sensitive beam splitting surface is used.

An alternative, advantageous solution is to provide the beam splitting surface as the first surface of the beam-splitter 2 encountered by the incoming rays (i.e. the surface is opposite mirror 4, while the anti-reflection surface is located in the beam-splitter 2 further towards the louvred plate 3). In this circumstance the ghost image is formed from an attenuated beam, and is further attenuated by a second transmission through the beam splitting surface.

FIG. 9 shows a modified design, in which the beam-splitter 2 is replaced with a surface 30 divided into alternating mirrored 31 and transparent strips 32 (e.g. by photolithography and etching of an aluminium coated glass surface). Some of the rays which are incident on the patterned mirror are transmitted through the "clear" sections, and are absorbed in the louvred plate 3, whilst the others are reflected in such a manner as to pass through a clear section. By suitable design of the pattern of mirror strips it is possible to produce a device of up to 50% efficiency. The strips have to be small enough to be essentially unnoticeable, and the alignment of the various components must be carefully arranged.

We claim:

1. Equipment for projecting light onto a surface, the equipment comprising:
   beam-splitting means for effecting partial reflection and partial transmittance of an incident beam;
   a light source located on one side of the beam-splitting means for directing light onto the beam-splitting means;
   mirror means on said one side of the beam-splitting means for directing back towards the beam-splitting means light reflected from the beam-splitting means;
   and louvre means located on the other side of the beam-splitting means for permitting passage therethrough of light in a predetermined restricted range of incident angles relative to a normal to the beam-splitting means.

2. Equipment according to claim 1 wherein the light source includes a display panel for producing an image to be projected.

3. Equipment according to claim 1 wherein said predetermined restricted range of incident angles relative to a normal to the beam-splitting means varies with position along the louvre means.

4. Equipment according to claim 3, the louvre means comprising a substrate having a plurality of passageways arranged in side-by-side relation for allowing transmission of light of an incident angle relative to an axis of a passageway within a predetermined range wherein two or more adjacent passageways have a transmission direction at an angle of deviation from a parallel relationship.

5. Equipment according to claim 1 further comprising a Fresnel lens arrangement intermediate the beam-splitting means and the louvre means.

6. Equipment according to claim 1 wherein the beam-splitting means comprises a substrate having alternating reflective and transparent strips.

7. Equipment according to claim 1 wherein an anti-reflection coating is provided on a surface of the beam-splitting means on said other side of the beam splitting means.